US009797792B2

United States Patent
Moore

(10) Patent No.: US 9,797,792 B2
(45) Date of Patent: Oct. 24, 2017

(54) SYSTEMS AND METHODS FOR TACTILE FUR SENSING

(71) Applicant: Toyota Motor Engineering & Manufacturing North America, Inc., Erlanger, KY (US)

(72) Inventor: Douglas A. Moore, Livermore, CA (US)

(73) Assignee: TOYOTA MOTOR ENGINEERING & MANUFACTURING NORTH AMERICA, INC., Erlanger, KY (US)

( * ) Notice: Subject to any disclaimer, the term of this patent is extended or adjusted under 35 U.S.C. 154(b) by 278 days.

(21) Appl. No.: 14/658,045

(22) Filed: Mar. 13, 2015

(65) Prior Publication Data

US 2016/0265994 A1 Sep. 15, 2016

(51) Int. Cl.
*G01C 9/04* (2006.01)
*G01L 5/22* (2006.01)
*G01L 1/20* (2006.01)
*B25J 13/08* (2006.01)

(52) U.S. Cl.
CPC ............ *G01L 5/228* (2013.01); *B25J 13/084* (2013.01); *G01L 1/205* (2013.01); *Y10S 901/09* (2013.01); *Y10S 901/46* (2013.01)

(58) Field of Classification Search
USPC .......................................... 73/726
See application file for complete search history.

(56) References Cited

U.S. PATENT DOCUMENTS

| 4,694,231 | A | | 9/1987 | Alvite' | |
|---|---|---|---|---|---|
| 5,014,224 | A | * | 5/1991 | Hans | G06F 3/045 338/99 |
| 5,311,779 | A | * | 5/1994 | Teruo | A43B 3/0005 338/4 |
| 6,286,226 | B1 | * | 9/2001 | Jin | H01H 1/0094 200/61.41 |

(Continued)

OTHER PUBLICATIONS

Seith, Anil K. et al.; "Texture Discrimination by an Autonomous Mobile Brain-Based Device with Whiskers"; Proceedings of the 2004 IEEE International Conference on Robotics & Automation; pp. 4925-4930; Apr. 2014.

(Continued)

*Primary Examiner* — Rodney Fuller
(74) *Attorney, Agent, or Firm* — Snell & Wilmer L.L.P.

(57) ABSTRACT

A tactile fur sensing system and a method of operating thereof allow early detection of an impending contact with an object. A plurality of filaments or threads are positioned on a zone or area of a surface of robotic device in a cost-effective manner. One or more sensors are configured to detect electrical resistance and/or displacement of the plurality of filaments or threads. A processor determines that there is contact with an object based on the detected electrical resistance and/or displacement. The detection of electrical resistance can be based on adjustable baseline values and/or adjustable threshold values. A plurality of nubs may alternatively or in addition be positioned on a surface area. Each nub has an outer cast or protection layer defining a cavity therein. At least a portion of a sensor for detecting resistance and/or displacement is positioned within the cavity of the nub.

20 Claims, 10 Drawing Sheets

(56) References Cited

U.S. PATENT DOCUMENTS

| | | | | |
|---|---|---|---|---|
| 6,437,258 | B1* | 8/2002 | Sandbach | G01L 1/205 178/18.05 |
| 6,538,367 | B1* | 3/2003 | Choi | H01J 1/304 313/308 |
| 7,774,951 | B2 | 8/2010 | Hartmann et al. | |
| 7,777,478 | B2* | 8/2010 | Dai | G01D 5/142 324/109 |
| 8,020,456 | B2* | 9/2011 | Liu | B82Y 10/00 73/862.621 |
| 8,033,189 | B2* | 10/2011 | Hayakawa | B25J 13/084 73/865.7 |
| 8,414,246 | B2 | 4/2013 | Tobey | |
| 8,504,500 | B2 | 8/2013 | Hartmann et al. | |
| 2001/0043200 | A1* | 11/2001 | Sandbach | G01L 1/205 345/173 |
| 2002/0194934 | A1* | 12/2002 | Taylor | G01L 1/205 73/862.046 |
| 2004/0106203 | A1* | 6/2004 | Stasiak | G01N 27/3278 422/82.01 |
| 2008/0067618 | A1* | 3/2008 | Wang | B82Y 10/00 257/415 |
| 2008/0264185 | A1* | 10/2008 | Kobayashi | B82Y 15/00 73/862.637 |
| 2009/0044639 | A1* | 2/2009 | Maekawa | B25J 13/082 73/862.474 |
| 2009/0272201 | A1* | 11/2009 | Loeb | G01L 5/228 73/862.041 |
| 2014/0090489 | A1* | 4/2014 | Taylor | G01L 1/00 73/862.626 |
| 2015/0019013 | A1* | 1/2015 | Rose | G01L 1/16 700/258 |
| 2015/0292964 | A1* | 10/2015 | Sibbett | B25J 19/02 73/862.632 |
| 2016/0186366 | A1* | 6/2016 | McMaster | D04B 1/14 66/202 |

OTHER PUBLICATIONS

Sugiura et al.; "Detecting Shape Deformation of Soft Objects Using Directional Photoreflectivity Measurement"; UIST'11, pp. 509-516. Oct. 16-19, 2011.

Sullivan et al.; "Tactile Discrimination Using Active Whisker Sensors"; IEEE Sensors Journal; vol. 12, No. 2; pp. 350-362, Feb. 2012.

Nojima et al.; "Hairlytop Interface: an Interactive Surface Display Comprised of Hair-Like Soft Actuators"; IEEE World Haptics Conference 2013; pp. 431-435; Apr. 14-18, 2013.

Furukawa et al.; "Fur Interface with Bristling Effect Induced by Vibration"; Proceedings of the 1st Augmented Human International Conference, AH 2010, Megève, France; 6 pages; Apr. 2-4, 2010.

Flagg et al.; "Conductive Fur Sensing for a Gesture-Aware Furry Robot"; IEEE Haptics Symposium 2012; pp. 99-104; Mar. 4-7, 2012.

Russell, R. Andrew; "Using Tactile Whiskers to Measure Surface Contours"; Proceedings of the 1992 IEEE International Conference on Robotics and Automation; pp. 1295-1299; May 1992.

Liu et al.; "Biomimetic Flexible/Complaint Sensors for a Soft-Body Lamprey-Like Robot"; Robotics and Autonomous Systems 58; pp. 1138-1148; 2010.

Vásárhelyi et al.; "Effects of the Elastic Cover on Tactile Sensor Arrays"; Sensors and Actuators A 132; pp. 245-251; 2006.

Fend et al.; "The Artificial Mouse—A Robot with Whiskers and Vision"; 6 pages; Proceedings of the 35 th International Symposium on Robotics; 2004.

Lungarella et al.; "An Artificial Whisker Sensor for Robotics"; Proceedings of the 2002 IEEE/ RSJ International Conference on Intelligent Robots and Systems; pp. 2931-2936; Oct. 2002.

Li et al.; "A Novel Bioinspired PVDF Micro/Nano Hair Receptor for a Robot Sensing System"; Sensors 2010 ; vol. 10; pp. 994-1011; 2010.

* cited by examiner

SYSTEMS AND METHODS FOR TACTILE FUR SENSING

BACKGROUND

Field

The invention relates to robotic sensing systems and methods of controlling and operating the robotic sensing systems, and more particularly to systems and methods for tactile sensing.

Description of the Related Art

With the increasing popularity of robotic devices in industrial and personal use applications, sensing the surrounding environment has become ever important. Many robotic devices generally interact with objects in their surrounding environment. If the robotic devices contact these objects in an improper manner, the robotic device and/or the object can be damaged or broken. For example, if a robotic device grabs a glass too quickly, the glass may break. Therefore, it is ideal for robotic devices to detect an object before the object comes into contact with the robotic device. This early or prior detection allows the robotic device to anticipate the impending contact and have additional time to react to the object.

Furthermore, traditional sensing systems of robotic devices that have the capability of sensing an object near a robotic device are expensive, bulky and complex. In certain applications, robotic devices have relatively large surface areas that may be exposed to an impending contact. Placement of numerous expensive sensors over the surface areas is cost-prohibitive and not feasible. In addition, when each sensor generates a different set of data, analysis and processing of such a large collection of data becomes overly complex and cause significant time delays.

Hence, there is a need in the art for an accurate and efficient, yet cost-effective and non-complex, object sensing solution to acquire a general tactile understanding of relatively large surface areas of the robotic device that are expected to contact an object. Furthermore, there is a need for an object sensing solution that simplifies tactile data sensing and analysis in order to allow the robotic device to react quickly and in real-time to the impending contact.

SUMMARY

The invention relates to a tactile fur sensing system and a method of controlling and operating thereof that allow sensing an impending contact between a surface of a robotic device and an object before the object contacts the surface. The tactile fur sensing system provides a cost-effective solution to advantageously gain a tactile understanding of a surface area upon which a plurality of filaments, threads, and/or nubs are positioned.

According to an aspect of the invention, a robotic sensing system includes a first plurality of filaments or threads positioned on a first zone or area of a surface. A first sensor is connected to the first plurality of filaments or threads. The first sensor is configured to detect first sensor data corresponding to at least one of a first electrical resistance value or a first displacement of the first plurality of filaments or threads. A processor is communicatively coupled to first sensor. The processor is configured to determine a first contact between the first plurality of elements or threads with a first object prior to contact of the first object with the first zone or area of the surface based on the first sensor data.

According to another aspect of the invention, a robotic sensing system is provided, having a plurality of nubs or elements positioned on a surface area. Each nub or element is configured to be flexible in order to be displaced upon contact with an object. Each nub or element includes an outer cast or protection layer defining a cavity therein. A sensor is configured to detect a displacement of the nub or element, with at least one part of the sensor positioned in the cavity of the outer cast or protection layer. The outer cast or protection layer prevents contact between the sensor and an object outside the cavity. A processor is communicatively coupled to the sensor, and configured to determine that at least one part of the surface area is in contact with the object based on the detected displacement.

The sensor may be a pressure-based sensor configured to generate a signal when a pressure applied to the outer cast or protection layer exceeds a force or pressure threshold. The part of the sensor that is positioned in the cavity includes a first electrical contact and a second electrical contact. The sensor is configured to generate a signal when the first electrical contact is connected to the second electrical contact, which occurs when sufficient pressure is applied to the outer cast or protection layer.

According to yet another aspect of the invention, a method for detecting an impending contact between a robotic device and an object is provided. A plurality of filaments or threads are positioned on a zone or area of a surface of a robotic device. A baseline value is stored in a memory. The baseline value corresponds to at least one of a baseline resistance value detected by the sensor or a rate or amount of change in the resistance value. The baseline value is determined when the plurality of filaments or threads are in a first position and without contact with an object. A sensor connected to a plurality of filaments or threads detects the resistance value corresponding to the plurality of filaments or threads. A processor determines a first contact with a first object based on the detected resistance value and the stored baseline value. The processor resets the baseline value when or after the plurality of filaments or threads are in a steady state position without contact with an object. The processor utilizes the detected resistance value and the reset baseline value for determining whether there is a second contact with the first object or a second object.

The systems and methods of the invention provide an economical solution for effective, efficient and early detection of an impending contact between a robotic device and an object.

BRIEF DESCRIPTION OF THE DRAWINGS

Other systems, methods, features, and advantages of the present invention will be apparent to one skilled in the art upon examination of the following figures and detailed description. Component parts shown in the drawings are not necessarily to scale, and may be exaggerated to better illustrate the important features of the present invention, wherein.

DETAILED DESCRIPTION

The invention relates to tactile fur sensing systems and methods that can detect an object that is in close proximity to a device (such as a robotic device). An impending contact is detected prior to physical contact between the object and the robotic device. In certain embodiments, the tactile fur sensing system includes one or more conductive filaments or threads arranged in a zone or area of a surface of the robotic device. When an object contacts the filaments or threads, they are displaced and resistance across the plurality of filaments or threads changes. The displacement and/or resistance value can be detected by one or more sensors. This advantageously allows a processor communicatively coupled to the sensors to detect the proximity of an object. In other embodiments, nubs or elements are provided, each having an outer cast or protective layer. At least a part of a sensor is positioned in a cavity defined in the outer cast or protective layer. The outer cast or protective layer protects the sensor positioned therein.

The embodiments described herein provide an accurate and efficient, yet cost-effective and non-complex, object sensing solution for acquiring a general tactile understanding of relatively large surface areas of a robotic device and for early detection of an impending contact between an object and a surface of a robotic device, without requiring complex sensing circuitry and/or processing. The object sensing solution also simplifies tactile data sensing and analysis in order to allow the robotic device to react quickly and in real-time to the impending contact. Hence, the robotic sensing systems and methods described herein advantageously provide a more cost-effective, accurate and safe way of interacting with objects. In addition, the early detection advantageously avoids damage or harm to the object or person and increases the accuracy in picking up, moving or interacting with the object or person.

Figure 1:
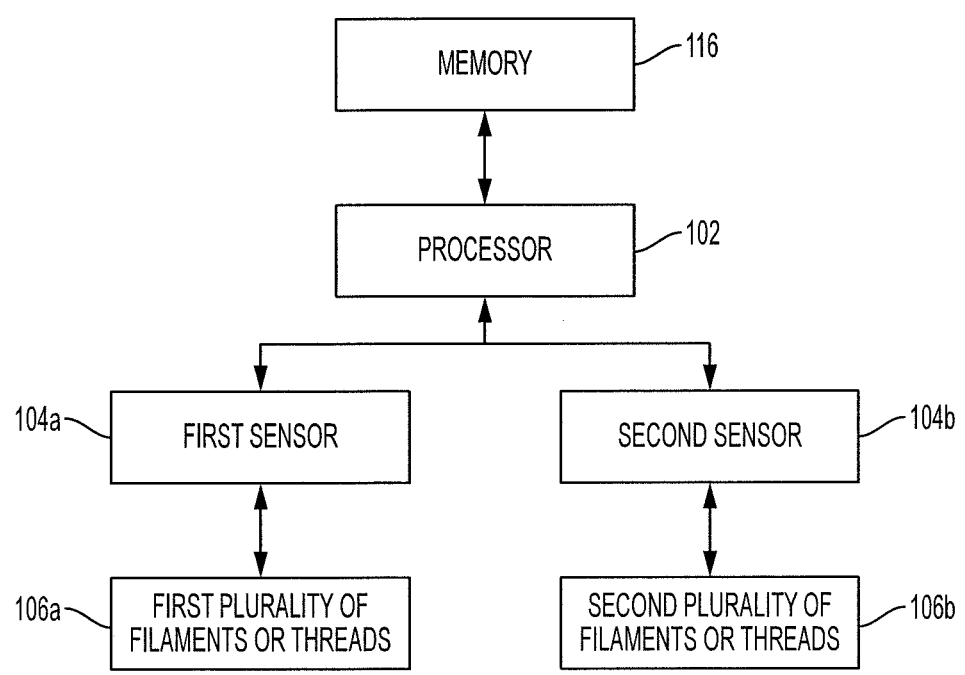
FIG. 1 is a block diagram of a tactile sensing system according to an aspect of the invention.

The discussion now turns to interaction of certain elements of the tactile sensing system, as shown in the block diagram of FIG. 1. A first plurality of filaments or threads 106a are electrically coupled to at least one sensor, such as the first sensor 104a. The first plurality of filaments or threads 106a may include conductive or non-conductive filaments, threads, fibers, and/or other elements that can form a fur-like structure when positioned as a group on a surface and can provide sensing feedback upon contact with an object. As a result of a contact with an object, the first plurality of filaments or threads 106a are displaced. Displacement upon contact with the object results in a change of the electrical resistance across the first plurality of filaments or threads 106a. The first sensor 104a is configured to detect first data that corresponds to a first displacement and/or a first electrical resistance value of the first plurality of filaments or threads 106a.

Similarly, a second plurality of filaments or threads 106b are electrically coupled to at least one sensor, such as the second sensor 104b. The second sensor 104b is configured to detect a second displacement and/or a second electrical resistance value corresponding to the second plurality of filaments or threads 106b.

A processor 102 is communicatively coupled to the first sensor 104a and the second sensor 104b. The processor 102 is configured to analyze first data detected by the first sensor 104a and the second data detected by the second sensor 104b to draw an inference about areas of contact with one or more objects. The processor 102 makes this determination based on threshold data and baseline data stored in a memory 116 communicatively coupled to the processor 102.

To illustrate the importance of early detection of contact with the surface, consider an example that a robot seeks to pick up an object with a robotic arm. It is desirable for the robotic arm to avoid physical contact with another object or person because such force may harm the other object or the person. Furthermore, if the robotic arm moves too quickly or the applied force is great enough, the object that is intended to be picked up may be broken or damaged. By early detection of an impending contact, the robotic device may have more time to take action, such as stopping or slowing movement or moving in an opposite direction. In addition, the early detection avoids damage or harm to the object or person and increases the accuracy in picking up, moving or interacting with the object or person.

The processor 102 may be one or more processors of a control unit or a controller of a robotic device positioned remotely. The processor 102 is communicatively coupled to the first sensor 104a, the second sensor 104b and/or the memory 116. The memory 116 includes an internal memory of the robotic device. Alternatively or in addition, the memory 116 includes a remote cloud-based memory accessible to the processor 102 via wireless communication. The discussion now turns to an example of the structure and arrangement of the first and the second plurality of filaments or threads 106a-b.

Figure 2A:
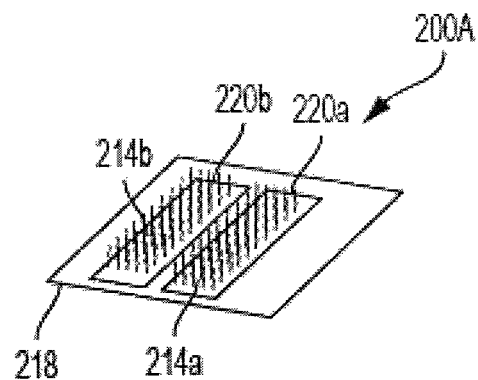
FIG. 2A is a schematic view of a plurality of non-overlapping zones or area of a robotic surface, each having a plurality of filaments or threads for robotic sensing, according to an aspect of the invention.

Referring to FIG. 2A, a tactile fur sensing system 200A ("system 200A") includes a first plurality of filaments or threads that are positioned as a first patch 214a on a first zone or area 220a of a surface 218. The surface 218 may correspond to an outer surface of a robotic device such as a robotic arm. The first patch 214a is connected to a first sensor 204a (not shown). The system 200A further includes a second plurality of filaments or threads positioned as a second patch 214*b* on a second zone or area 220*b* of the surface 218. The second patch 214*b* is connected to a second sensor 204*b* (not shown).

In a preferred embodiment, the filaments or threads are electrically conductive. Alternatively, non-conductive filaments or threads may also be used. The first patch 214*a* and/or the second patch 214*b* may have a fur texture. The texture is compliant such that the filaments or threads may not return to their original position or orientation after sufficient contact with an object. For example, each of the first plurality of filaments or threads of the first patch 214*a* has a certain angle as compared with the surface 218 before contact with an object. After contact with an object, each filament or thread that had sufficient contact with the object may have a substantially different angle as compared with the surface 218 after contact with the object.

It is desirable to have filaments or threads that are long enough to detect contact with an object before the object contacts the surface of the robotic device. However, the rigidity of the filaments or threads would decrease as the length of the filaments or threads is increased. It is desirable for the filaments or threads to be rigid enough to be in a position to influence or be influenced by the object before the object contacts the surface of the robotic device. As such, the length is designed to be long enough to contact the object while maintaining a minimum level of rigidity. The length of the filaments or threads of a given patch can be uniform across a given patch, or may vary across a given patch, depending on design parameters. The length of filaments or threads of a given patch (e.g., first patch 214*a*) may be the same as or different from the length of filaments or threads of another patch (e.g., second patch 214*b*). The length of the filaments or threads may vary based on the location of the zone or area upon which the filaments or threads are positioned and/or expected distance with an object. If the patch is located in open space in an area expected to receive contact forces in different directions, a greater level of rigidity would be desirable. More compliant filaments or threads can be used if the patch is located on a surface that is rested vertically up or down and the direction of contact forces are expected to be relatively uniform.

The filaments or threads of the first patch 214*a* and/or the second patch 214*b* may be arranged to have similar density and length of, for example, a toothbrush. A given millimeter square of a zone or area of the surface 218 may have between 8 and 12 filaments or threads. The length of an extension of each filament or thread from the surface 218 may be at least 7 millimeters long.

In the preferred embodiment, each of the first patch 214*a* and/or the second patch 214*b* is connected to one sensor in order to gain a tactile understanding of a zone or area of the surface 218 without utilizing a high number of sensors. This may also advantageously reduce the complexity of sensing, processing and/or analysis in order to provide an earlier tactile understanding. As discussed above, an early tactile understanding can advantageously allow the robotic device to prepare for and/or react to an impending contact. In other embodiments, one or more of the patches can each be connected to more than one sensor.

Figure 5:
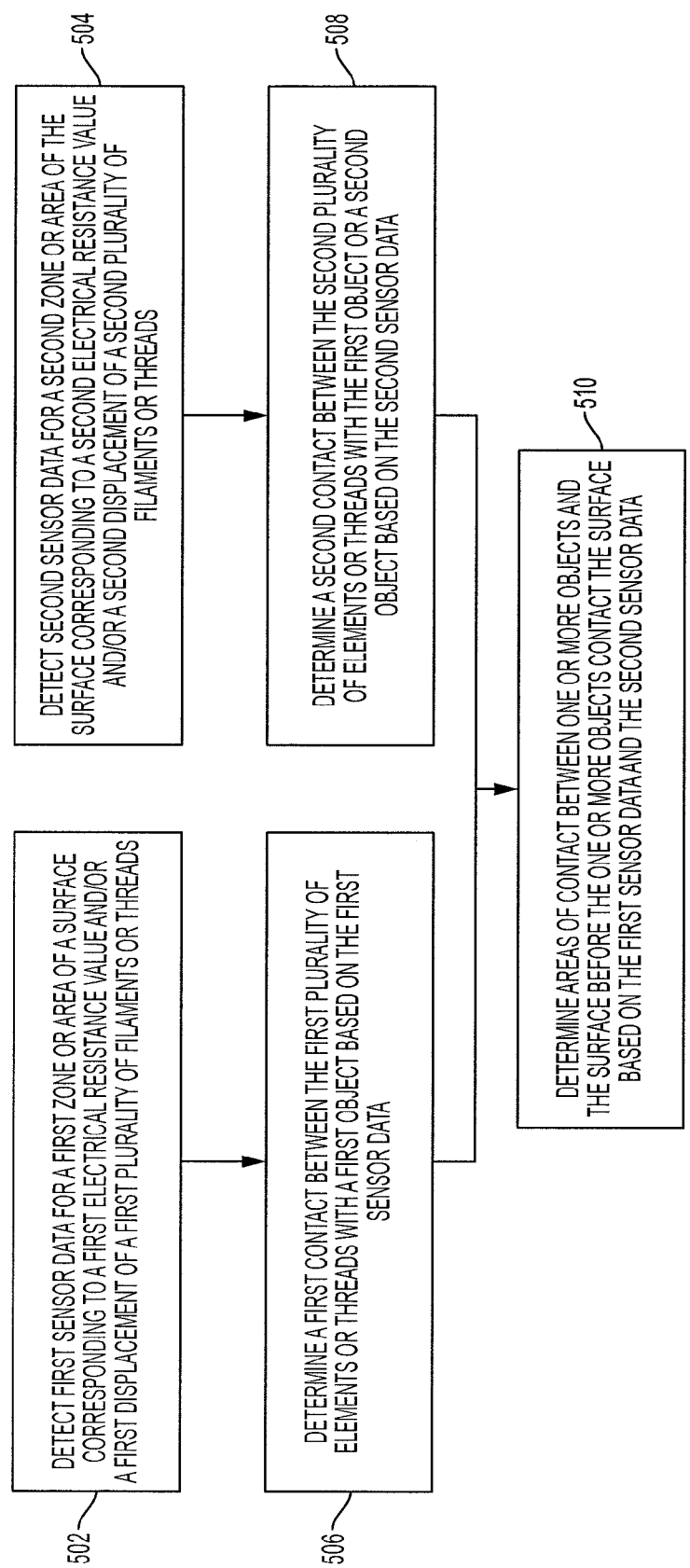
FIG. 5 is a flowchart diagram of a method for detecting an object contacting a plurality of filaments or threads positioned on a zone or area of a surface of a robotic device according to an aspect of the invention.

The discussion now turns to an example of operation of the system 100 or 200 discussed above. The first sensor 104*a* detects first sensor data for a first zone or area 220*a* of the surface 218 (see also step 502 of FIG. 5). The first sensor data may correspond to a first electrical resistance value or a first displacement of a first plurality of filaments or threads. For example, first sensor 104*a* may be a resistance-based sensor that detects a first electrical resistance value. The first electrical resistance value may correspond to resistance sensed across the first patch 214*a*.

The first sensor 104*a* may be a pressure-based sensor configured to generate a signal when a pressure applied to the first patch 214*a* exceeds a pressure threshold. Alternatively, the first sensor 104*a* may be a pressure-based and resistance-based sensor. Once enough pressure is applied and the switch is closed, the resistance value is determined for determining the type of contact. The second sensor 104*b* detects second sensor data for a second zone or area 220*b* of the surface 218 (see also step 504). The second sensor data may correspond to a second electrical resistance value and/or a second displacement of a second plurality of filaments or threads of a second patch 214*b*.

The processor 102 determines whether there is a first contact between the first plurality of elements or threads of a first patch 214*a* with a first object based on the first sensor data (see also step 506). In the embodiment that the first sensor 104*a* is a resistance-based sensor, the processor 102 may determine that the first contact is established prior to contact of the first object with the first zone or area 220*a* based on the first electrical resistance value and an electrical resistance threshold value stored in the memory 116.

Not every change in resistance value corresponds to a contact with an object. Resistance value can change when there is a change in environmental conditions (such as wind that causes bending of the filaments or threads) or due to movement of the robotic device or part. Resistance values can also change if there is contact with another part of the robotic device. A range of resistance values during contact with an object may be stored in the memory 116. The processor 102 is configured to determine that there is contact with an object when the sensed resistance value falls within the range of resistance values. Alternatively or in addition, a range of rates of change in the resistance values can be stored such that the processor 102 can determine whether the detected change in resistance value indicates a certain type of contact. For example, the absolute value of rate or amount of change in resistance may be greater for contacts with an object as compared with contacts with another part of the robotic device and even further different as compared with mild fluctuations due to environmental conditions.

The stored threshold values may correspond to lower and upper bounds of resistance values or rates of changes in resistance values that correspond to a contact with an object. Threshold values, ranges of resistance values, and/or ranges of rates of change in resistance values can be stored in the memory 116, in order to effectively determine whether there is contact and determine the type of contact. The processor 102 may further update the stored threshold values, ranges of resistance values, and/or ranges of rates of change in resistance values based on data collected regarding a contact with an object. The updated threshold values, ranges of resistance values, and/or ranges of rates of change in resistance values can be utilized for detecting and distinguishing types of future contacts.

In the embodiment that the first sensor 104*a* is a pressure-based sensor, contact with an object can be detected when the pressure exceeds a certain pressure threshold value stored in the memory 116. Alternatively, a switch may be used without detection of a number or value. The first sensor 104*a* may have a switch that would close when the pressure exceeds a threshold value, and as a result, the first sensor 104*a* would generate a signal. In such an embodiment, the first sensor data can be a binary value, corresponding to either the switch being closed or open. The processor 102 determines that there is contact of an object with the first patch 214a when the switch is closed and the corresponding signal is received from the first sensor 104a. Similar to the process set forth above, the processor 102 can determine a second contact between the second plurality of elements or threads with the first object or a second object based on the second sensor data (see also step 508).

Figure 2B:
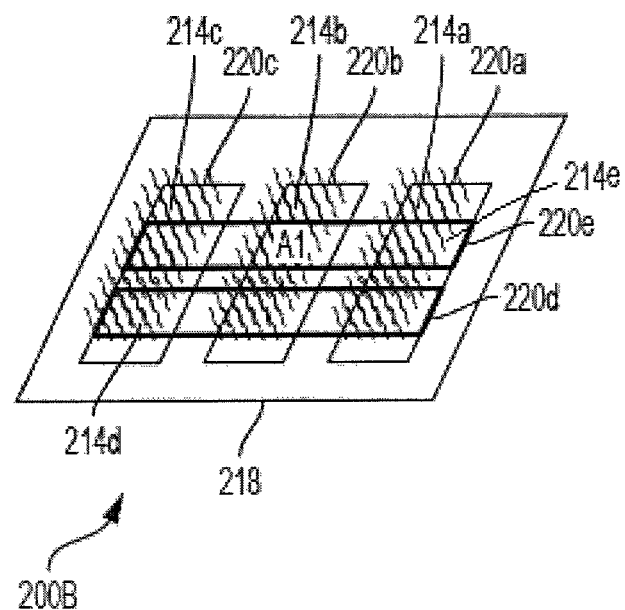
FIG. 2B is a schematic view of a plurality of overlapping zones or area of a robotic surface, each having a plurality of filaments or threads for robotic sensing, according to an aspect of the invention.

Although two sets of sensor data and two zones or areas are discussed above, impending contact with additional zones or areas can be determined as discussed below, for example, with respect to FIG. 2B. The processor 102 determines areas of contact between one or more objects and the surface 218 before the one or more objects contact the surface 218. The determination is based on the first sensor data, the second sensor data, and/or additional sensor data (see also step 510).

Using the method described above, proximity of an object to a relatively large area of a surface of a robotic device can be effectively determined in a cost-effective manner. Data regarding each zone or area can be put together to obtain a map of areas of contacts and optionally types of contacts. This advantageously provides a tactile understanding of a relatively large surface area without use of complex sensors. Specific localization of points of contact may not be obtained and is not necessary. Use of complex sensing devices and/or processing would not be necessary either. Rather, a general understanding of areas of contact with an object can be determined prior to contact with an object.

Figure 6:
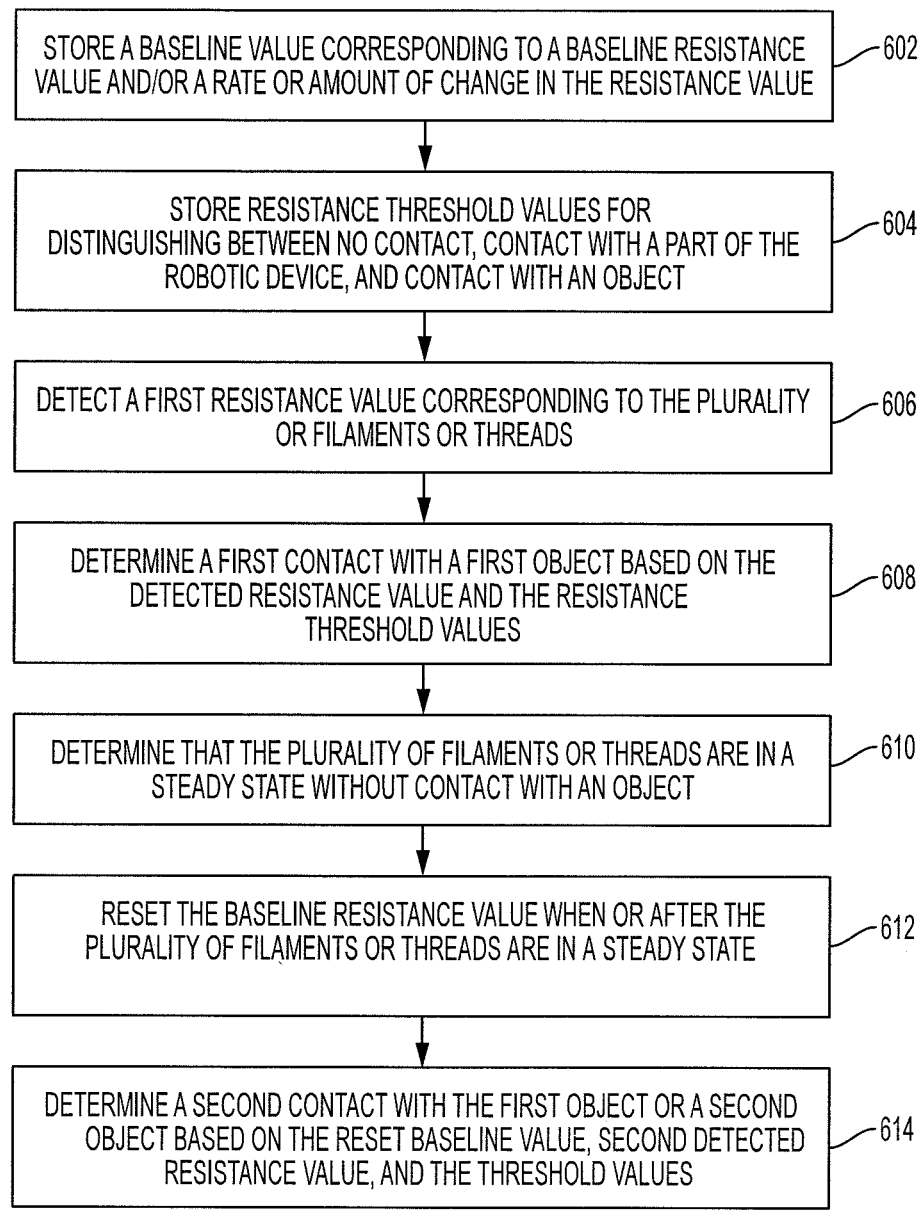
FIG. 6 is a flowchart diagram of a method for detecting an object contacting a plurality of filaments or threads positioned on a zone or area of a surface of a robotic device based on a reset baseline value according to an aspect of the invention.

The discussion now turns to a method of determining contact with an object based on an adjustable baseline value. A first patch (e.g., the first patch 214a) is connected to a resistance-based sensor (e.g., the first sensor 104a). A baseline value for the first sensor 104a may be initially stored in the memory 116. The baseline value may correspond to a baseline resistance value and/or an amount or rate of resistance change (see also step 602 of FIG. 6). The baseline value may correspond to an initial condition in which the first patch 214a has not yet contacted other objects.

As discussed above, a threshold value or a range of resistance values with upper and lower boundaries defined by threshold resistance values may be stored in the memory 116. The one or more threshold resistance values distinguish between no contact, contact with another part of the robotic device, or contact with an exterior object (see also step 604).

The first sensor 104a detects a first resistance value corresponding to the first plurality of filaments or threads of the first patch 214a (see also step 606). The processor 102 is configured to analyze the detected first resistance value and/or the rate of change in the resistance value based on the stored one or more threshold resistance values. Considering the scenario in which a first object contacts the first patch 214a, the processor 102 determines that there is a first contact with the first object (see also step 608). The processor 102 reaches this determination by comparing the resistance value and/or the change in the resistance value to the stored one or more threshold resistance values.

Before contact with the object, the first plurality of filaments or threads of the first patch 214a are in a first position or orientation. The filaments or threads that contact the object may change position or orientation. In other words, the filaments or threads would not return to their original position or orientation, and therefore, would not exhibit the same resistance value that they did prior to contact with the object. The change in measurement of resistance value may lead to inaccuracy for future detection of contact. To prevent or substantially reduce the inaccuracy, the processor 102 resets the baseline value based on a resistance value that is sensed in a steady state condition. In order to reset the resistance value, the processor 102 may first determine that the plurality of filaments or threads are in a steady state condition (see also step 610). The steady state condition may correspond to a condition after contact with the object, and when there is no further contact between the first patch 214a and an object. During the steady state condition, the processor 102 resets the baseline value (see also step 612). A subsequent second contact between the plurality of filaments or threads and the first object or a second object can be determined by analyzing a second detected resistance value based on the reset baseline value and the resistance threshold values (see also step 614).

Although the foregoing method is described with respect to a resistance-based sensor, a similar process can be applied to pressure-based sensors to reset or re-adjust the baseline values after contact with an object.

In the embodiments discussed above with respect to FIGS. 1 and 2A, only two sets of filaments or threads were described. Alternatively, the invention can be extended to include additional sets of filaments or threads, each having one or more sensors to provide a tactile understanding of contacts with the surface of the robotic device.

In the embodiment shown in FIG. 2A, the first and second plurality of filaments or threads are each arranged as non-overlapping patches 214a-b. As illustrated in FIG. 2B, two or more patches may have overlapping portions. Each of the first, second, and third plurality of filaments or threads are arranged as a first patch 214a, a second patch 214b and a third patch 214c, respectively. The first, second, and third patches 214a-c cover a first, second, and third zone or area 220a, 220b, and 220c, respectively. A fourth and a fifth plurality of filaments or threads are arranged as a fourth and fifth patch 214d and 214e, respectively. The fourth and fifth patches 214d and 214e cover a fourth and fifth zone or area 220d and 220e, respectively. Each of the first, second, and third patches 214a-c has parts that overlap with the fourth and fifth patches 214d and 214e. The crisscross pattern of the patches 214a-e advantageously allows a two-dimensional understanding of contacts with a relatively large area of the surface 218.

This embodiment may have certain advantages to an embodiment in which the same area that patches 214a-e cover was instead covered by a continuously positioned plurality of filaments or threads. It may allow a relatively higher degree of localization because if both the second patch 214b and the fifth patch 214e detect contact with an object, it can be ascertained that there is contact at least in area indicated by "A1." It may also be more cost-effective to manufacture patches of filaments as strips that can then be positioned in desired patterns with overlapping regions. Furthermore, the overlapping regions may provide additional feedback because, for example, in the overlapping area "A1" a first resistance may be detected by the second patch 214b and a different resistance may be detected by the fifth patch 214e. For example, the object may contact filaments or threads of one patch more than the other. The two different inputs for the same area can serve as additional feedback for the overlapping regions to enhance detection of an impending contact.

In another embodiment, the areas of interest for detection, such as the areas covered by patches 214a-e can be covered by a combination of non-overlapping group of patches, or a continuous larger patch.

Figure 2C:
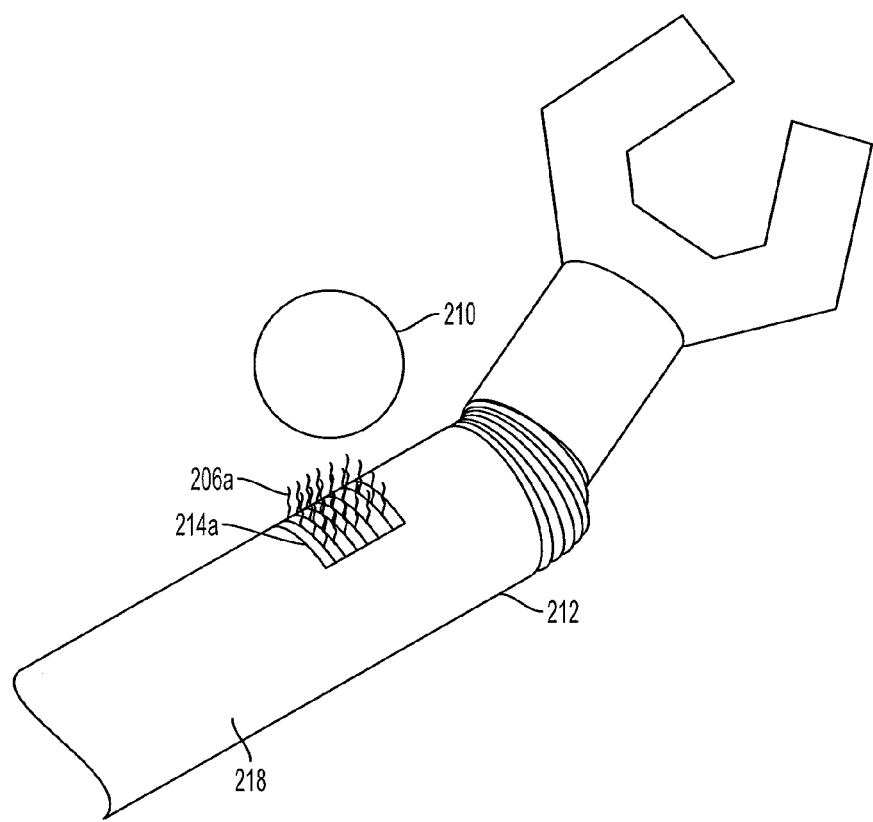
FIG. 2C is a schematic view of a robotic arm having at least one patch of sensing fur according to an aspect of the invention.

FIG. 2C shows a first patch 214a positioned on a first zone or area of the surface 218 of a robotic arm 212. The first patch 214a includes a first plurality of filaments or threads 206a. The detected resistance value across the first plurality of filaments or threads 206a and/or its rate or amount of change would change upon contact with an object 210. Additional patches may be positioned on the robotic arm 212 as discussed above and as shown, for example, in FIGS. 2A and 2B.

Alternatively, one or more of the patches 214a-e may be a woven conductive yarn, as discussed in more details with respect to FIGS. 3A-3D.

Figure 3A:
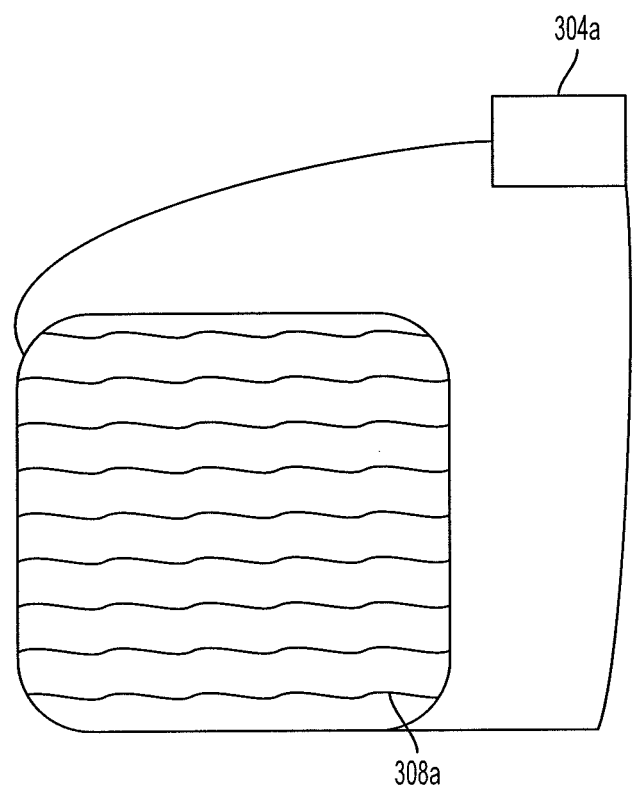
FIG. 3A is a schematic side view of a woven conductive yarn connected to a sensor according to an aspect of the invention.

Referring to FIG. 3A, a yarn 308a may be positioned on or around a robotic device. The yarn 308a may be a group of conductive fibers that are woven together. The yarn 308a can be connected to a first sensor 304a configured to detect a resistance from one corner to another corner of the yarn 308a. Alternatively, resistance across other parts of the yarn can be detected.

Figure 3B:
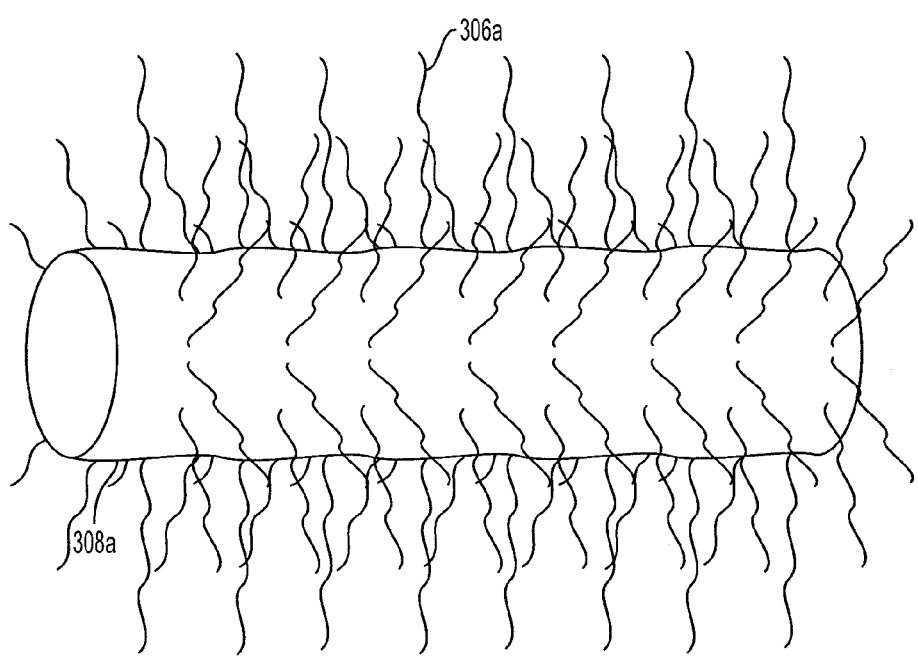
FIG. 3B is a schematic view of a woven conductive yarn according to an aspect of the invention.

Referring to FIG. 3B, the yarn 308a may advantageously have a cylindrical shape to properly or snugly fit around a robotic arm. The yarn 308a can be positioned, for example, around a robotic arm. Certain conductive fibers 306a of the yarn 308a are designed such they are sufficiently "fuzzy" in order to ensure that the conductive fibers 306a extrude radially outward to contact an object. Upon contact with the conductive fibers 306a, the resistance value of the yarn 308a changes upon contact.

Figure 3C:
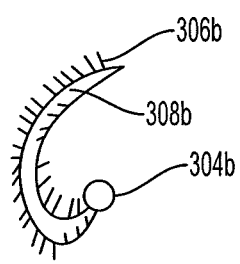
FIG. 3C is a schematic view of a strand of conductive yarn connected to a sensor according to an aspect of the invention.
Figure 3D:
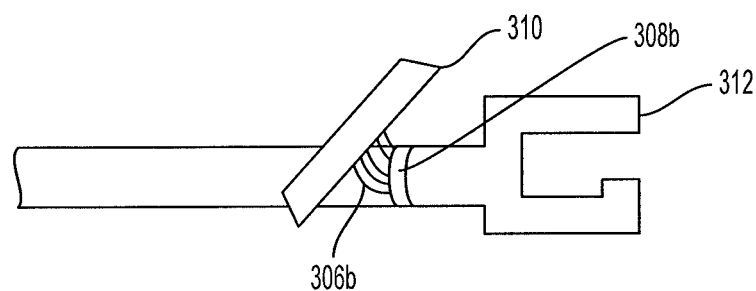
FIG. 3D is a schematic view of a strand of conductive yarn wrapped around a robotic arm according to an aspect of the invention.

Referring to FIG. 3C, a strand of yarn 308b made of woven conductive fibers 306b is connected to a sensor 304b. The sensor 304b is configured to detect resistance across the strand of yarn 308b. As shown in FIG. 3D, one or more strands of yarn (such as strand of yarn 308b) can be wrapped around the robotic arm 312 in order to detect contact with an object 310.

In the embodiments described above, the filaments or threads and/or the fibers of the yarns were in direct contact with an object. Alternatively, a robotic device may be positioned in an environment in which filaments or threads can be severely damaged, thereby affecting the accuracy of detection. In such conditions, a plurality of nubs with an outer casting or protective layer may be utilized to prevent damage to sensing devices.

Figure 4A:
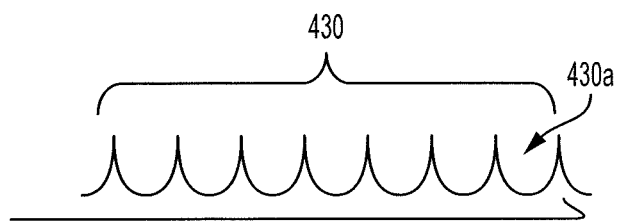
FIG. 4A is a schematic side view of a plurality of nubs or elements for object sensing according to an aspect of the invention.

Referring to FIG. 4A, a plurality of nubs 430 may be utilized for detecting contact with an object. A "nub" as used herein refers to an element that has an outer casting or protective layer. The outer casting or protective layer protects against damage from the environment or objects therein (for example, from liquids or chemicals). The nubs 430 may be waterproof. The plurality of nubs are preferably made of polyurethane. The plurality of nubs 430 are designed to be long enough to interact with an object. The nubs 430 may be configured to detect pressure and generate a signal when the pressure or force exceeds a threshold. The nubs 430 may have a pressure-based sensor within the outer cast that is connected to a reservoir containing a liquid. A force on a nub 430a would exert certain measurable pressure on the liquid. Alternatively, the pressure-based sensor may be a switch that would be in an on or off state prior to contact. The switch would be in an opposite state upon application of sufficient pressure to the nub, as discussed below with respect to FIG. 4C.

Figure 4C:
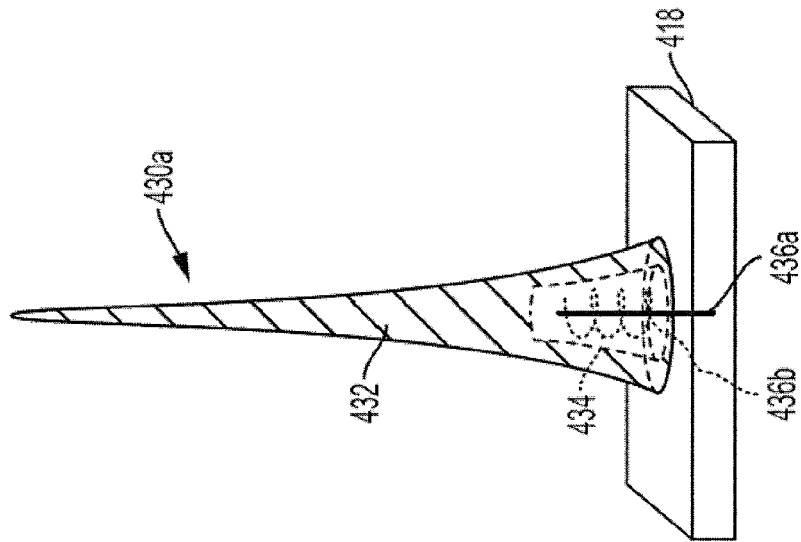
FIG. 4C is a schematic isometric view of a sensor positioned inside a cavity of a nub or an element according to an aspect of the invention.
Figure 4B:
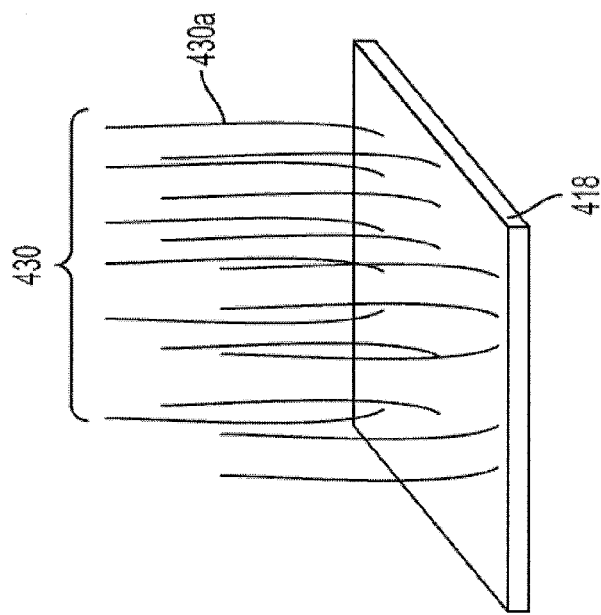
FIG. 4B is a schematic isometric view of a plurality of nubs or elements positioned on a surface for object sensing according to an aspect of the invention.

As shown in FIG. 4B, the plurality of nubs 430 may be positioned on a surface 418. The surface 418 may correspond to a surface of a robotic device. The plurality of nubs 430 may be arranged to have similar density and length of, for example, a common toothbrush. A given millimeter square of a zone or area of the surface upon which nubs 430 are placed may have between 8 and 12 nubs. The length of an extension of each nub 430 may be at least 7 millimeters long.

Referring to FIG. 4C, a nub 430a includes an outer cast or protection layer 432 that defines a cavity 434 therein. The outer case or protection layer 432 may be a relatively thin molded layer. The boundaries of the cavity 434 are shown by dotted lines. A sensor 404a is provided to detect a displacement of the nub 430a, with at least one part of the sensor 404a positioned in the cavity 434. The processor 102 is communicatively coupled to the sensor 404a, and configured to determine that at least one part of the surface area is in contact with the object based on the detected displacement.

The sensor 404a may be a pressure-based sensor configured to generate a signal when a pressure applied to the outer cast or protection layer 432 exceeds a pressure threshold. The part of the sensor 404a that is positioned in the cavity 434 may include a first electrical contact 436a and a second electrical contact 436b. The sensor 404a is configured to generate a signal when the first electrical contact 436a is connected to the second electrical contact 436b, which occurs when sufficient pressure is applied to the outer cast or protection layer 432.

Using the methods and systems described above, proximity of an object to a relatively large area of a surface of a robotic device can be effectively determined in a cost-effective manner. By reducing complexity of detection and utilizing relatively long threads or filaments, the robotic device can have adequate time to react to an impending contact due to the early detection.

The described sensing system and method can be advantageously combined with other sensing methods and systems. For example, if certain object is detected using the fur-based system, the processor 102 may control a camera of the robotic device to focus on the object in order to learn more about the object.

The steps described above with respect to FIGS. 5 and 6 may not necessarily be performed in the order presented above. For example, one or more sensors may detect sensor data and a corresponding impending contact may be determined simultaneously, before, and/or after sensing and impending contact determinations for other zones or areas.

While only certain embodiments of the invention have been described in detail, a person skilled in the art would appreciate that certain changes and modifications may be made in the embodiments without departing from the spirit and scope of the invention. A person skilled in the art would appreciate the invention may be practiced other than as specifically described with respect to the foregoing embodiments of the method/system.

What is claimed is:

1. A robotic sensing system, comprising:
   a first plurality of filaments or threads each having a length of at least 7 millimeters, and positioned on a first zone or area of a surface;
   a first sensor connected to the first plurality of filaments or threads, and configured to detect first sensor data corresponding to at least one of a first electrical resistance value or a first displacement of the first plurality of filaments or threads; and
   a processor communicatively coupled to first sensor, and configured to determine a first contact between the first plurality of elements or threads and a first object based on the first sensor data, prior to contact between the first object and the first zone or area of the surface.

2. The robotic sensing system of claim 1, further comprising:
   a second plurality of filaments or threads positioned on a second zone or area of the surface; and a second sensor connected to the second plurality of filaments or threads, and configured to detect second sensor data corresponding to at least one of a second electrical resistance value or a second displacement of the second plurality of filaments or threads, wherein the processor is further communicatively coupled to the second sensor and further configured to determine a second contact between the second plurality of elements or threads and the first object or a second object based on the at least one of the second electrical resistance value or the second displacement, prior to contact between the first object or the second object and the second zone or area of the surface.

3. The robotic sensing system of claim 2, wherein
the first zone or area has a first portion and a second portion,
the second zone or area has a first portion and a second portion,
the first portion of the first zone or area overlaps with the first portion of the second zone or area, and
the second portion of the first zone or area does not overlap with any portion of the second zone or area.

4. The robotic sensing system of claim 2, wherein the first zone or area does not overlap with the second zone or area.

5. The robotic sensing system of claim 2, wherein the processor is further configured to determine, based on the first sensor data and the second sensor data, areas of contact between one or more objects and the surface before the one or more objects contact the surface.

6. The robotic sensing system of claim 1, wherein
the first sensor is a switch-based sensor that includes a switch that is open either when there is no contact between the first plurality of filaments or threads and an object, or when there is contact between the first plurality of filaments or threads and the object that is less than a force or pressure threshold,
the switch is closed when there is contact between the first plurality of filaments or threads and the object that is greater than or equal to the force or pressure threshold,
the first sensor data has a binary value, corresponding to either the switch being closed or open, and
the processor is configured to determine that the first contact is established when or after the switch is closed.

7. The robotic sensing system of claim 1, further comprising a memory configured to store one or more electrical resistance threshold values, wherein
the first sensor is a resistance-based sensor that detects the first electrical resistance value, and
the processor is configured to determine that the first contact is established prior to contact of the first object with the first zone or area of the surface, based on the first electrical resistance value and the one or more electrical resistance threshold values.

8. The robotic sensing system of claim 1, wherein
the first plurality of filaments or threads form a fur texture, each of the first plurality of filaments or threads having a first angle as compared with the surface, and
at least one filament or thread of the first plurality of filaments or threads that contacts the first object has a second angle as compared with the surface as a result of the first contact, the second angle being substantially different than the first angle.

9. The robotic sensing system of claim 1, wherein the first sensor is the only sensor that is connected to the first plurality of filaments or threads, and is configured to detect contact between an object and the first plurality of filaments or threads.

10. The robotic sensing system of claim 1, wherein the surface corresponds to an outer surface of a robotic part or device, and the first plurality of filaments or threads corresponds to a woven conductive yarn positioned on the surface of the robotic part or device.

11. The robotic sensing system of claim 1, wherein the first plurality of filaments or threads includes at least 8 filaments or threads positioned on a millimeter square of the first zone or area of the surface.

12. The robotic sensing system of claim 1, wherein the first plurality of filaments or threads are made of a conductive material.

13. A robotic sensing system, comprising:
a plurality of nubs positioned on a surface area and configured to be flexible in order to be displaced upon contact, each nub including:
an outer cast or protection layer having a length of at least 7 millimeters, and defining a cavity therein, and
a sensor configured to detect a displacement of the nub, with at least one part of the sensor positioned in the cavity of the outer cast or protection layer, the outer cast or protective layer configured to prevent contact between the at least one part of the sensor and an object outside the cavity; and
a processor communicatively coupled to the sensor, and configured to determine a first contact between the plurality of nubs and a first object prior to contact between the first object and the first zone or area of the surface based on the detected displacement.

14. The robotic sensing system of claim 13, wherein the sensor is a pressure-based sensor configured to generate a signal when a pressure or force applied to the outer cast or protection layer exceeds a pressure or force threshold.

15. The robotic sensing system of claim 13, wherein
the at least one part of the sensor includes a first electrical contact and a second electrical contact,
the first electrical contact is configured to contact the second electrical contact when sufficient pressure or force is applied to the outer cast or protection layer by an object, and
the sensor is configured to generate a signal when the first electrical contact contacts the second electrical contact.

16. The robotic sensing system of claim 13, wherein the outer cast is made of urethane and is molded.

17. A method for detecting an impending contact with an object using a plurality of filaments or threads positioned on a zone or area of a surface of a robotic device, the method comprising:
storing, in a memory, a baseline value corresponding to at least one of a baseline resistance value or a rate or amount of change in a resistance value, when the plurality of filaments or threads are in a first position without contact with any object;
detecting, using a sensor connected to the plurality of filaments or threads, the resistance value corresponding to the plurality of filaments or threads;
determining, using a processor communicatively coupled to the sensor and the memory, a first contact between the plurality of filaments or threads and a first object based on the detected resistance value and the stored baseline value;
determining, by the processor, that the plurality of filaments or threads are in a steady state position, that is different than the first position, without contact with the object;

resetting, using the processor, the stored baseline value when or after the plurality of filaments or threads are in the steady state position; and determining, using the processor, a second contact between the plurality of filaments or threads and the first object or a second object based on the detected resistance value and the reset baseline value.

18. The method of claim 17, further comprising:

storing one or more resistance threshold values for distinguishing between a contact with the object and a contact with a part of the robotic device, the one or more resistance threshold values being based on at least one of an electrical resistance value or a rate or amount of change in the electrical resistance value, wherein the step of determining, using the processor, the first contact is further based on the stored one or more resistance threshold values.

19. The method of claim 17, wherein the step of resetting, using the processor, the stored baseline value is performed when or after the processor determines that the plurality of filaments or threads are in the steady state and without any contact with the object.

20. The method of claim 17, wherein each of the plurality of filaments or threads has a length of at least 7 millimeters.

\* \* \* \* \*